(12) United States Patent
Vigliotti et al.

(10) Patent No.: US 7,887,273 B2
(45) Date of Patent: Feb. 15, 2011

(54) BLIND RIVET AND METHOD

(75) Inventors: Daniel P. Vigliotti, Hamden, CT (US); Edward D. McCusker, Winsted, CT (US); Jerry Robertson, Columbia, KY (US); Steven V. Jones, Birmingham (GB); Daniel R. Smith, Kidderminster (GB)

(73) Assignee: Newfrey LLC, Newark, DE (US)

( * ) Notice: Subject to any disclaimer, the term of this patent is extended or adjusted under 35 U.S.C. 154(b) by 520 days.

(21) Appl. No.: 11/227,021

(22) Filed: Sep. 15, 2005

(65) Prior Publication Data

US 2007/0059120 A1 Mar. 15, 2007

(51) Int. Cl.
*F16B 13/06* (2006.01)
(52) U.S. Cl. .......................................... 411/38; 411/43
(58) Field of Classification Search .................. 411/34, 411/38, 43, 45
See application file for complete search history.

(56) References Cited

U.S. PATENT DOCUMENTS

| | | | |
|---|---|---|---|
| 388,443 A | 8/1888 | Platt | |
| 437,817 A | 10/1890 | King | |
| 1,504,764 A | 8/1924 | Johnson | |
| 1,578,172 A | 3/1926 | Retterath | |
| 2,017,421 A * | 10/1935 | Post | 411/38 |
| 2,030,165 A | 2/1936 | Huck | |
| 2,148,977 A | 2/1939 | Buck | |
| 2,236,079 A * | 3/1941 | Wipper | 411/38 |
| 2,341,598 A | 2/1944 | Crowley | |
| 3,055,255 A | 9/1962 | Burrell | |
| 3,178,989 A | 4/1965 | Siebol | |
| 3,194,106 A | 7/1965 | Carusi et al. | |
| 3,204,517 A | 9/1965 | Looker | |
| 3,230,818 A | 1/1966 | Siebol | |
| 3,309,747 A * | 3/1967 | Smith | 24/688 |
| 3,370,451 A | 2/1968 | Schuetz | |
| 3,570,031 A | 3/1971 | Auriol | |
| 3,638,259 A | 2/1972 | Eibes et al. | |
| 3,667,340 A | 6/1972 | Black et al. | |
| 3,718,068 A | 2/1973 | Passer | |
| 3,789,728 A | 2/1974 | Shackelford | |
| 3,797,358 A | 3/1974 | Allender | |
| 4,041,766 A | 8/1977 | Johnson et al. | |

(Continued)

FOREIGN PATENT DOCUMENTS

DE 3104854 A1 8/1982

(Continued)

OTHER PUBLICATIONS

POP Blind Fastening Product Catalog and Engineering Handbook, Emhart Fastening Teknologies, dated Jul. 1997.

(Continued)

*Primary Examiner*—Flemming Saether
(74) *Attorney, Agent, or Firm*—Michael P. Leary

(57) ABSTRACT

A blind rivet includes a hollow rivet body having a longitudinally extending indented groove. The groove may be shaped to impart rivet setting characteristics that may be varied to provide desirable fastening characteristics for joints in a number of industries. The shape of the indentation on the rivet body may be varied to cause a portion of the rivet body to collapse and form a secondary head at a predetermined longitudinal location.

41 Claims, 8 Drawing Sheets

U.S. PATENT DOCUMENTS

| | | | |
|---|---|---|---|
| 4,059,980 | A | 11/1977 | Nance |
| 4,074,608 | A | 2/1978 | Siebol |
| 4,170,919 | A | 10/1979 | Siebol |
| 4,170,920 | A | 10/1979 | Siebol |
| 4,269,106 | A * | 5/1981 | Leibhard et al. ............... 411/34 |
| 4,355,934 | A * | 10/1982 | Denham et al. ............... 411/38 |
| 4,399,682 | A | 8/1983 | Hackett |
| 4,523,445 | A | 6/1985 | Yoshida |
| 4,556,351 | A | 12/1985 | Wollar et al. |
| 4,580,936 | A | 4/1986 | Francis et al. |
| 4,639,175 | A | 1/1987 | Wollar |
| 4,696,610 | A | 9/1987 | Wright |
| 4,708,553 | A | 11/1987 | Braychak et al. |
| 4,752,168 | A * | 6/1988 | Richter ........................ 411/38 |
| 4,776,737 | A | 10/1988 | Wollar |
| 4,836,728 | A | 6/1989 | Mauer et al. |
| 4,869,629 | A | 9/1989 | Witzigman |
| 4,969,785 | A | 11/1990 | Wright |
| 5,044,850 | A | 9/1991 | Getten et al. |
| 5,167,585 | A | 12/1992 | Williams |
| 5,205,688 | A * | 4/1993 | Sundstrom .................... 411/38 |
| 5,259,713 | A | 11/1993 | Renner et al. |
| 5,312,215 | A * | 5/1994 | Anquetin ...................... 411/38 |
| 5,380,135 | A | 1/1995 | Anquetin |
| 5,476,350 | A | 12/1995 | Kurtz et al. |
| 5,496,140 | A | 3/1996 | Gossmann et al. |
| 5,645,383 | A | 7/1997 | Williams |
| 5,658,107 | A | 8/1997 | Smith |
| 5,690,454 | A * | 11/1997 | Smith .......................... 411/30 |
| 5,759,001 | A | 6/1998 | Smith |
| 5,846,039 | A | 12/1998 | Kirchen et al. |
| 5,894,753 | A | 4/1999 | Sachot et al. |
| 6,004,086 | A | 12/1999 | Gand et al. |
| 6,224,310 | B1 | 5/2001 | Summerlin et al. |
| 6,254,324 | B1 | 7/2001 | Smith et al. |
| 6,398,472 | B1 | 6/2002 | Jones |
| 6,428,255 | B1 | 8/2002 | Smith |
| 6,447,399 | B1 | 9/2002 | Denham |
| 6,494,652 | B1 | 12/2002 | Summerlin |
| 6,537,005 | B1 | 3/2003 | Denham |
| 6,602,034 | B2 * | 8/2003 | Wakai et al. .................. 411/37 |
| 6,854,940 | B2 | 2/2005 | Jennings et al. |
| 6,857,962 | B2 | 2/2005 | Weedon |
| 2003/0219324 | A1 | 11/2003 | Piacenti et al. |
| 2005/0002760 | A1 | 1/2005 | Hayashi et al. |
| 2005/0008455 | A1 | 1/2005 | Guy |

FOREIGN PATENT DOCUMENTS

| | | |
|---|---|---|
| DE | 3520730 A1 | 12/1986 |
| DE | 3817851 A1 | 12/1989 |
| EP | 0497455 A1 | 8/1992 |
| EP | 0631831 A1 | 1/1995 |
| EP | 0945631 A2 | 9/1999 |
| GB | 2 060 110 | 4/1981 |
| GB | 2 120 741 | 12/1983 |
| GB | 2 122 937 | 1/1984 |
| GB | 2147385 A | 5/1985 |
| GB | 2 337 951 | 12/1999 |
| GB | 2353834 A | 3/2001 |
| JP | 09-317743 | 12/1997 |

OTHER PUBLICATIONS

Excerpt from product brochure of Huck Commercial Products, believed to be published prior to Sep. 15, 2005.

Excerpt from product brochure of Gesipa Fasteners USA, Inc. dated 2005.

Excerpt from product brochure of Alcoa Fastening Systems dated 2004.

Excerpt from product brochure of Textron Fastening Systems dated May 2004.

Excerpt from product brochure of Textron Fastening Systems dated Aug. 2003.

European Search Report.

* cited by examiner

BLIND RIVET AND METHOD

BACKGROUND AND SUMMARY OF THE INVENTION

The present invention generally relates to blind rivets and, more particularly, to pull-type blind rivets having a large secondary head.

A number of blind rivets have been manufactured that include a hollow rivet body with a flanged head on one end and an opposite open end. A mandrel is at least partially positioned within the hollow rivet body and includes an enlarged head positioned adjacent the open end of the rivet body. The rivet body may be inserted into openings formed into workpieces that are to be joined to one another. The flanged head of the rivet body is positioned in engagement with a surface of one of the workpieces. A nose piece of a rivet setting tool is placed against the flanged head of the rivet body. The rivet setting tool includes a mechanism for pulling the mandrel. As the pulling mechanism pulls the mandrel, a portion of the rivet body between the mandrel head and the workpieces is collapsed on the opposite side of the far workpiece to form a secondary head on the rivet body to secure the rivet to the workpieces. This process is generally known in the art as "setting" the rivet. The rivet setting tool continues to pull the mandrel until the mandrel breaks at a predetermined point and at a predetermined break load thus leaving a portion of the mandrel within the set rivet body. At this time, the rivet is secured in the opening of the workpieces with the flanged head of the rivet body against a surface of one workpiece facing the operator performing the rivet setting operation and a formed secondary head against a surface of the other workpiece remote from the operator that is usually termed the "blind-side" surface.

Pull-type rivets have typically been used to join thin, soft or fragile materials to one another where access to only one surface is available. For example, brackets have been attached to foam insulated panels and thin metallic sheets have been coupled to one another using blind rivets. Accordingly, it should be appreciated that the demands of these industries are varied and that the product construction may need to be adjusted to suit the different requirements of each joint to be created and to give a reliable setting in each case. For instance, it may be desirable to reliably position the larger secondary head closer to the mandrel head in one application while in another application it may be desirable to reliably position the larger secondary head adjacent the flanged head of the rivet body. This joint design flexibility and reliability is not presently available in the known blind fastener art.

In addition, many of the applications using blind rivets include exposure to the elements on occasions where the relative humidity of the environment is high. In these applications, it may be necessary to prevent ingress of moisture past the head of the rivet after it has been set. Joint deterioration and structural damage may occur if the moisture is allowed to travel past the flanged head of the rivet body. Accordingly, it may be beneficial to provide a blind rivet having a means for sealing the flanged head of the rivet body against the workpiece and for the retained mandrel to seal within the bore of the rivet body.

The blind rivet of the present invention includes a rivet body having a longitudinally extending indented groove. The groove may be formed to define different shapes to impart different rivet setting characteristics that may be varied to provide optimum fastening characteristics to a variety of joints in a number of industries. For example, the shape of the indentation on the rivet body may be varied to cause a portion of the rivet body to collapse and form the secondary head adjacent to the flanged head on the end of the rivet body. A differently shaped indentation formed on the rivet body causes the rivet body to collapse and form the secondary head near the mandrel head.

In another feature, the rivet body is formed prior to setting to have a barrel-shaped shank positioned between the flanged head and the open end of the rivet body. The barrel shape significantly lowers the initial upset load that is needed to commence formation of the secondary head.

Furthermore, the rivet may include four indentations or slots circumferentially spaced apart from one another on the hollow rivet body. In this manner, four collapsed legs are formed during rivet setting. By creating four legs instead of the three legs shown in the prior art, the setting load is lower and allows the potential use of higher strength rivet materials resulting in higher tensile and shear strength.

Additionally, the blind rivet of the present invention includes a feature where the mandrel is coupled to the rivet body to allow shipping and handling of the rivet prior to setting as well as providing a feature for maintaining a portion of the mandrel within the rivet body after the setting procedure has been completed. A plurality of indentations are formed in the rivet body such that portions of the rivet body are displaced into a recess or recesses formed on the mandrel adjacent the mandrel head.

In addition, the blind rivet includes a seal positioned between the flanged head of the rivet body and the workpiece to prevent ingress of moisture or contamination around the set rivet. The rivet is further sealed by retaining a portion of the mandrel with the hollow body and causing the flange of the rivet body to engage the mandrel and one or more grooves. Lastly, the rivet body flange may be shaped such that it may accept a cover or cap. The cap may be colored to match or complement the colors of the individual workpiece.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
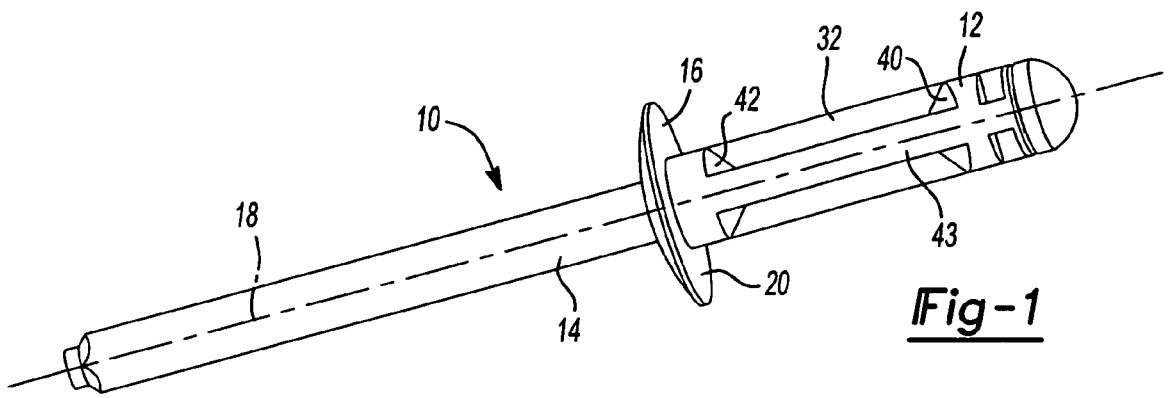
FIG. 1 is perspective view of an exemplary blind rivet of the present invention.
Figure 2:
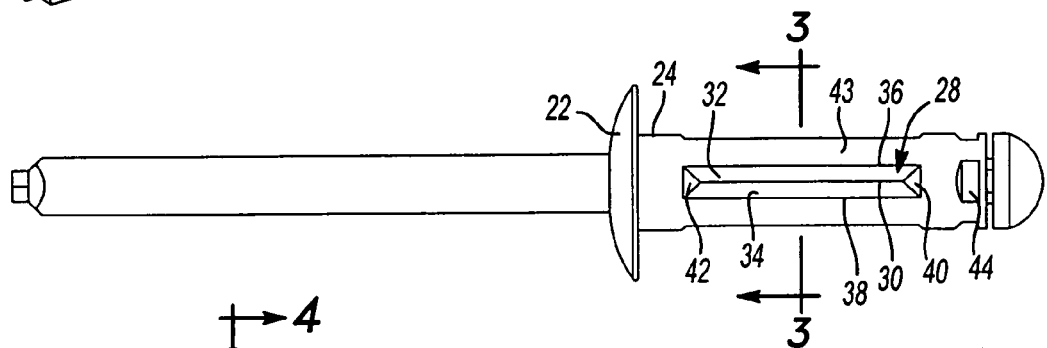
FIG. 2 is the side view of the blind rivet as shown in FIG. 1.
Figure 3:
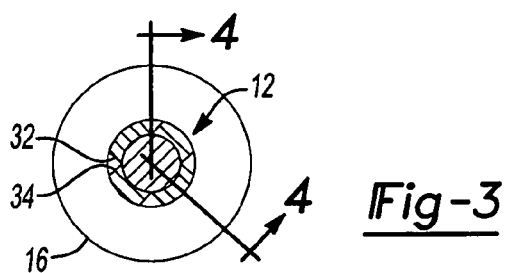
FIG. 3 is a cross-sectional view taken along line 3-3 as shown in FIG. 2.

The following description of the preferred embodiments is merely exemplary in nature and is in no way intended to limit the invention, its application, or uses.

FIGS. 1-4 and 6-13 relate to a first embodiment blind rivet 10 having a substantially cylindrical hollow rivet body 12 and a mandrel 14 coupled to rivet body 12. Rivet body 12 includes a flanged head 16 at one end. The flanged head 16 radially extends substantially perpendicular to the longitudinal axis 18 passing through the center of rivet body 12. Flanged head 16 includes a substantially planar first surface 20 and a concave second surface 22.

Rivet body 12 is substantially cylindrically shaped having an outer surface 24 and an inner cylindrical surface 26. Inner surface 26 is substantially smooth with no outwardly extending projections formed thereon.

Four circumferentially spaced apart indentations 28 are formed on outer surface 24 of rivet body 12. Each indentation 28 includes a slit or a cut 30 extending through the hollow rivet body 12.

Figure 5:
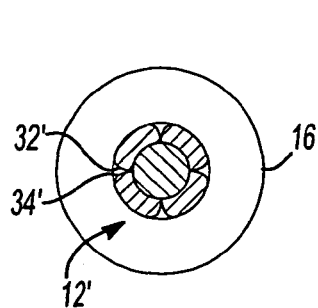
FIG. 5 is a cross-sectional view of an alternate embodiment blind rivet taken along a line similar to line 3-3 of FIG. 2.

Each indentation 28 includes a first longitudinally extending surface 32 and a second longitudinally surface 34. Each of surfaces 32 and 34 terminate at slit 30. First longitudinally extending surface 32 is also bounded by a longitudinally extending edge 36 that defines the interconnection between substantially planar longitudinally extending surface 32 and cylindrical outer surface 24. Second longitudinally extending surface 34 meets cylindrical surface 24 at an edge 38. The ends of slit 30 and longitudinally extending surfaces 32 and 34 are bounded by angled end surfaces 40 and 42. In the embodiment shown in FIG. 2, edge 36, edge 38 and slit 30 are substantially linear segments positioned substantially parallel to one another. Each of surfaces 32 and 34 are substantially planar and define an included angle ranging between 20 and 90 degrees. Surfaces 40 and 42 are also substantially planar. FIG. 5 depicts an alternate embodiment rivet body 12' including curved surfaces 32' and 34'. The surfaces 32' and 34' are curved in a laterally extending direction.

Figure 4:
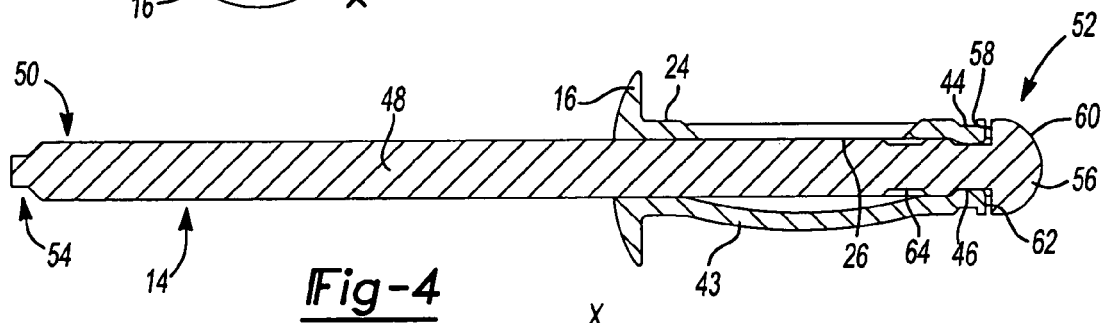
FIG. 4 is a cross-sectional view of the blind rivet taken along line 4-4 as shown in FIG. 3.

Returning to the embodiment depicted in FIGS. 1-4 and 6-13, rivet body 12 includes a plurality of column portions 43 circumferentially spaced apart from one another. Each column portion 43 is positioned between two of indentations 28. As best shown in FIG. 4, column portions 43 have a bowed shape prior to rivet setting. The bowed shape defines a maximum outer diameter at approximately the longitudinal midpoint of longitudinally extending slit 30. The bulged shape greatly reduces the initial tensile load required to be placed on mandrel 14 to begin to cause deformation of columns 43. By reducing the load required to buckle column portions 43, it is possible to increase the material strength of the rivet body to provide greater clamping force between flanged head 16 and the secondary head formed during rivet setting. It is contemplated that rivet body 12 may be constructed from a relatively high grade aluminum or possibly stainless steel to provide the desired joint clamp load and provide a greater resistance to applied forces pulling the joined materials apart.

Figure 4A:
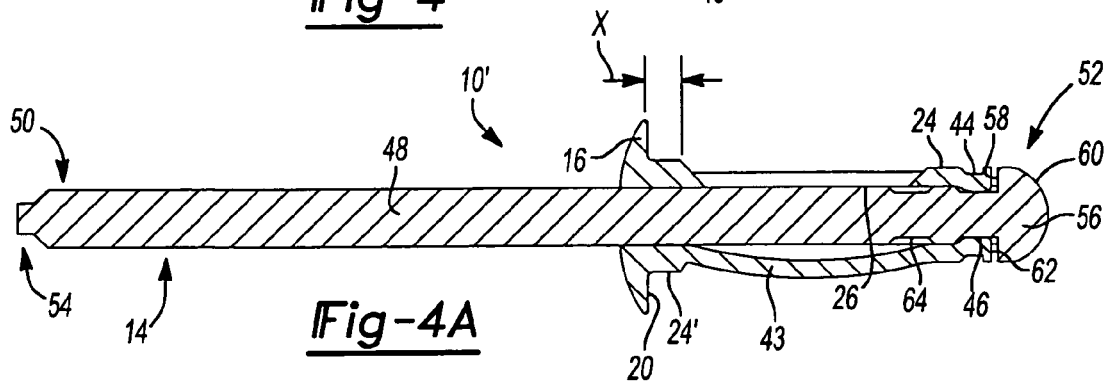
FIG. 4A is a cross-sectional view of an alternate embodiment blind rivet taken along a line similar to line 4-4 of FIG. 3.

FIG. 4A depicts an alternate embodiment blind rivet 10'. Rivet 10' is substantially similar to rivet 10 except that rivet body 12 has been modified to have an enlarged diameter portion 24' positioned adjacent flanged head 16. Accordingly, like elements will retain their previously introduced reference numerals. Enlarged diameter portion 24' axially extends a distance "X" from first surface 20 of flanged head 16. Distance "X" represents a minimum grip length for the particular rivet design. As such, the sum of the material thicknesses to be joined to one another by blind rivet 10' preferably equals or exceeds the minimum grip length. Furthermore, enlarged diameter portion 24' has an outer diameter of approximately the same size as the maximum outer diameter defined by the bulged shape of column portions 43.

With reference to the first embodiment shown in FIGS. 1-4 and 6-13, a second plurality of indentations 44 are formed in rivet body 12 near the open end. Second indentations 44 function to retain mandrel 14 within rivet body 12 during shipping and handling, prior to setting. Second indentations 44 also retain the portion of the mandrel that remains within the rivet body after setting. Mandrel 14 includes a plurality of indentations 46 in receipt of a portion of the upset material of rivet body 12 that is radially inwardly deformed during formation of second indentations 44.

Mandrel 14 includes a substantially cylindrical body 48 having a first end 50 and a second end 52. First end 50 includes a reduced diameter portion 54 that provides a locating function to ease insertion of mandrel 14 within a rivet setting tool. Second end 52 includes an enlarged head 56 having a bottom face 58 and a substantially spherical outer surface 60. The shape of outer surface 60 may also be substantially conical or otherwise tapered to facilitate insertion of blind rivet 10 within an aperture formed in a workpiece. Bottom face 58 is substantially planar and configured to engage a substantially planar end face 62 formed on the open end of rivet body 12.

Figure 7:
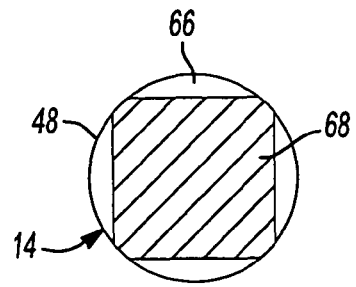
FIG. 7 is a cross-sectional view of the mandrel taken along line 6-6 shown in FIG. 6.
Figure 6:
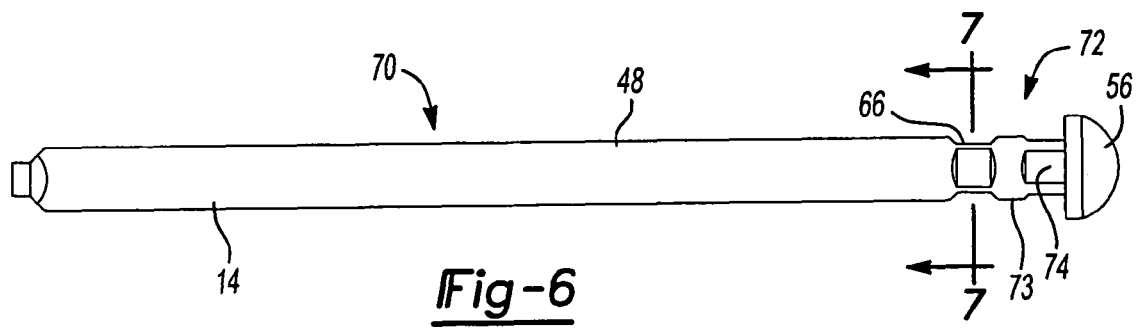
FIG. 6 is a side view of a mandrel separated from the blind rivet body.
Figure 8:
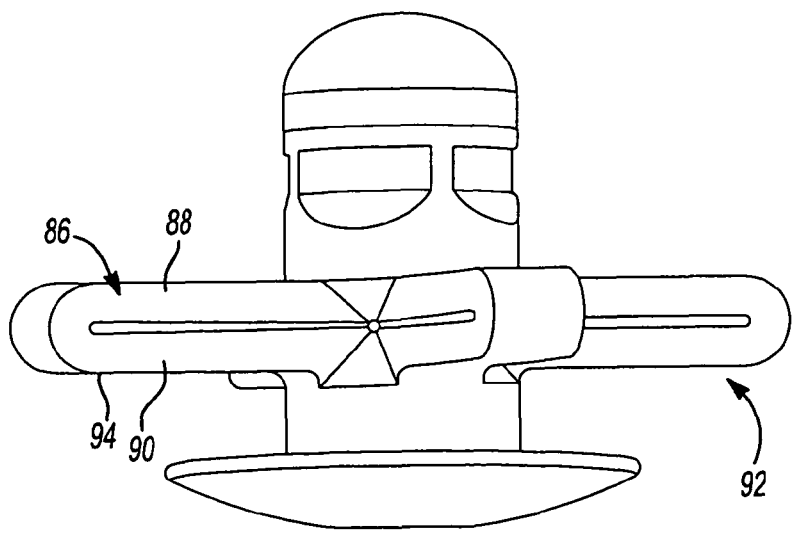
FIG. 8 is a perspective view of a blind rivet after the setting process has been completed.
Figure 9:
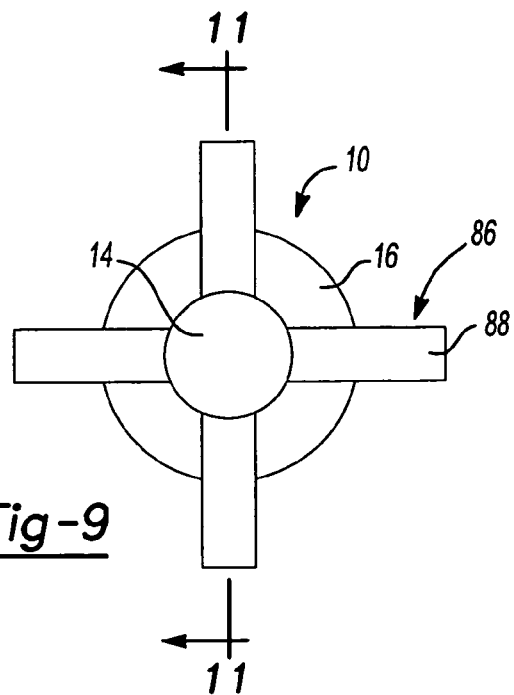
FIG. 9 is an end view of the blind rivet shown in FIG. 8.
Figure 10:
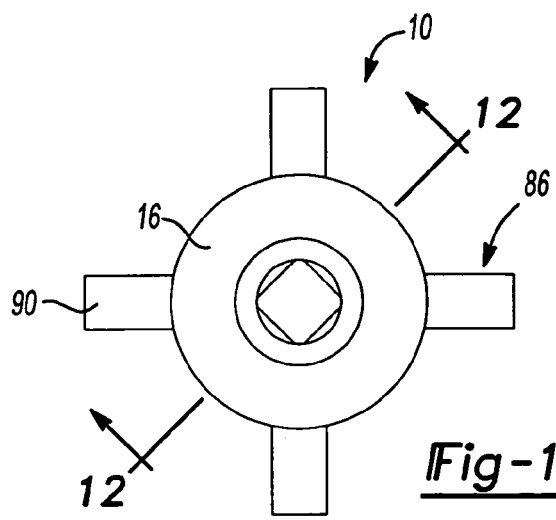
FIG. 10 is an opposite end view of the blind rivet shown in FIG. 8.
Figure 11:
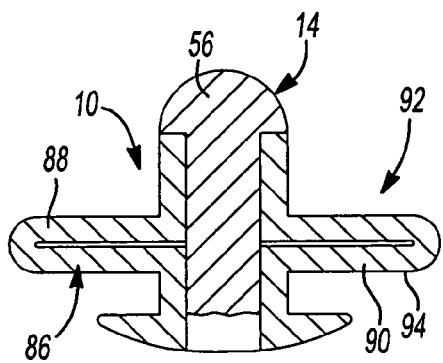
FIG. 11 is a cross-sectional side view of the blind rivet taken along line 11-11 as shown in FIG. 9.
Figure 12:
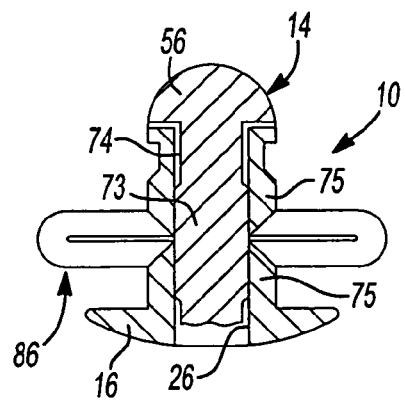
FIG. 12 is a cross-sectional view of the blind rivet taken along line 12-12 as shown in FIG. 10.

As mentioned earlier, mandrel 14 includes an indentation 46 to retain mandrel 14 to rivet body 12. Mandrel 14 also includes a groove 64 extending about the circumference of body 48 axially spaced apart from indentation 46. Groove 64 provides a reduced cross-sectional area of mandrel at which the mandrel separates during the setting process. Indentation 46 and/or groove 64 may be shaped as a cylindrical surface or as a plurality of localized planar portions defining a reduced cross-sectional area as shown in FIGS. 6 and 7. Specifically, four flats 66 are formed on mandrel body 48 to define a reduced cross-sectional area 68. Upon input of sufficient tensile load applied by the rivet setting tool, a first portion 70 of mandrel 14 will detach from a second portion 72. First portion 70 is positioned on an opposite side of reduced cross-sectional area 68 as second portion 72. Similarly, flats 74 are formed at four circumferentially spaced apart locations adjacent head 56 to define indentation 46 and provide clearance for the material upset during the formation of second indentations 44. Between flats 74 and flats 66 is a section 73 that is of uniform diameter that provides resistance to ingress of moisture when the rivet is set by having a tight or interference fit in the rivet body 12 at the location 75 (FIG. 12) adjacent to the flange 16.

Figure 13:
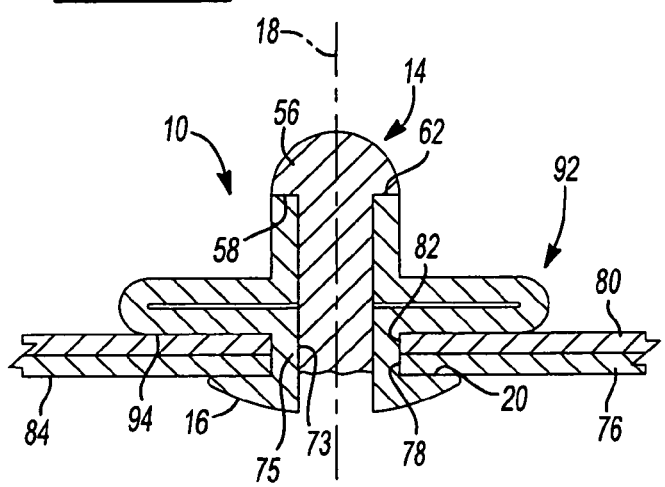
FIG. 13 is a cross-sectional side view of the blind rivet installed in an exemplary joint.

FIGS. 8-13 depict blind rivet 10 in a set state. During the rivet setting process, tensile force is applied to first end 50 of mandrel 14 after the blind rivet has been inserted within aligned apertures of the workpieces to be joined. FIG. 13 depicts an exemplary application for blind rivet 10 where a workpiece 76 includes an aperture 78 while another workpiece 80 includes an aperture 82. The blind rivet, prior to setting, is inserted through apertures 78 and 82 until first planar surface 20 of rivet body contacts a work surface 84 of workpiece 76. As tensile force is added to mandrel 14, flanged head 16 of rivet body 12 is maintained in contact with surface 84 of workpiece 76. During the setting process, head 56 of mandrel 14 is drawn into engagement with the rivet body 12. Specifically, bottom face 58 of mandrel 14 acts upon end face 62 of rivet body 12. As the rivet tool continues to apply tensile force to mandrel 14, a compressive force between flanged head 16 of rivet body 12 and head 56 of mandrel 14 increases until column portions 43 of rivet body 12 positioned between indentations 28 begin to buckle.

Upon completion of the rivet setting process, each column portion 43 is folded upon itself to form a leg 86. Based on the positioning of the indentations 28, four circumferentially spaced, laterally extending legs 86 are formed. Each leg includes a first laterally outwardly extending portion 88 and a laterally inwardly returning portion 90. The equally spaced legs 86 collectively define a secondary head 92 axially spaced apart from flanged head 16. Each leg 86 laterally extends from longitudinal axis 18 a distance greater than the flanged head 16. It should be appreciated that the axial positioning and length of slit 30 define the size of legs 86 and the distance between surface 20 of flanged head 16 and a clamping surface 94 formed on each leg 86. FIG. 13 shows that uniform diameter section 73 provides resistance to ingress of moisture when the rivet is set by having a tight or interference fit in the rivet body 12 at the location 75 adjacent to the flange 16.

Figure 14:
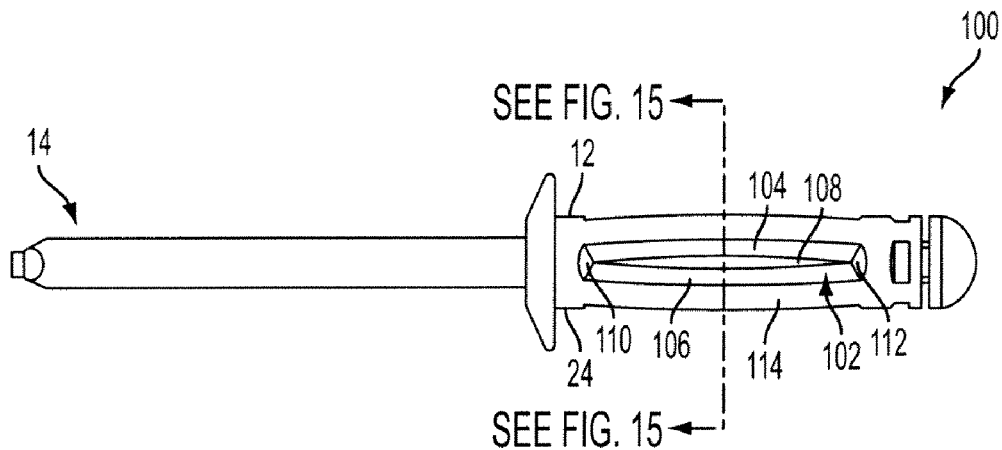
FIG. 14 is a side view of an alternate embodiment blind rivet.
Figure 15:
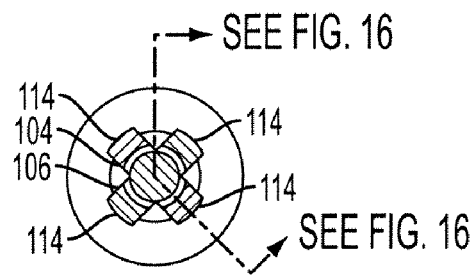
FIG. 15 is a cross-sectional view taken along line 15-15 as shown in FIG. 14.
Figure 16:
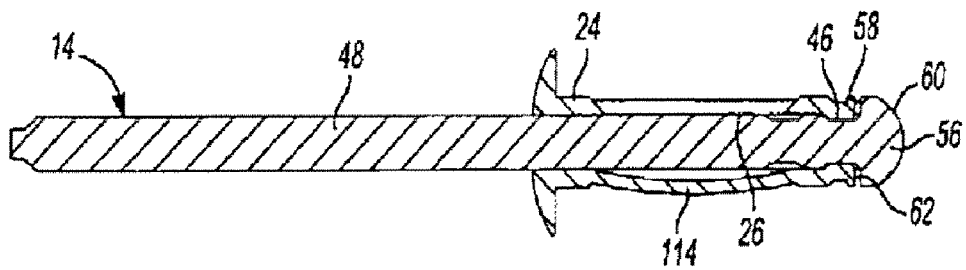
FIG. 16 is a cross-sectional view taken along line 16-16 as shown in FIG. 15.

FIGS. 14-16 depict an alternate embodiment blind rivet 100. Alternate embodiment blind rivet is substantially similar to blind rivet 10 except that blind rivet 100 includes oval shaped indentations 102 in lieu of indentations 28. Accordingly, like elements will retain their previously introduced reference numerals.

Indentation 102 is substantially oval-shaped having a maximum width at its axial midpoint. Indentation 102 includes a first substantially planar surface 104 and a second substantially planar surface 106. A cut or slit 108 extends through rivet body 12 and longitudinally extends between surfaces 104 and 106. End surfaces 110 and 112 slope downwardly from outer cylindrical surface 24 of rivet body 12 toward slit 108. Two boundary edges of the end surfaces are defined by surfaces 104 and 106 and a third edge is defined by the body surface 24. These surfaces form the shape of the indentation 102 at each end of the slit. Four column portions 114 are circumferentially spaced apart from one another such that each column 114 is positioned between two indentations 102. Column portions 114 are outwardly bulged having a maximum diameter axially aligned with the maximum width of indentation 102. Because the maximum width of indentation 102 is found at the midpoint of the axial length of slit 108, the minimum wall thickness of portion 114 is also positioned at the axial midpoint of slit 108. The aforementioned geometry causes a maximum stress condition to occur at the axial midpoint of slit 108 during the rivet setting process. In this manner, legs 86 may be repeatably formed because the minimum wall thickness location defines the axial position at which the portions 114 will buckle during compressive loading.

Figure 17:
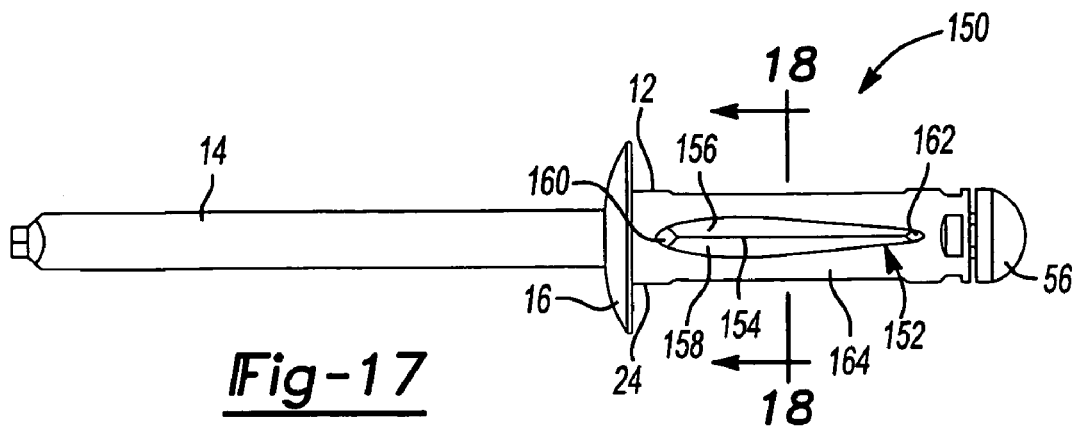
FIG. 17 is a side-view of another alternate embodiment blind rivet.
Figure 18:
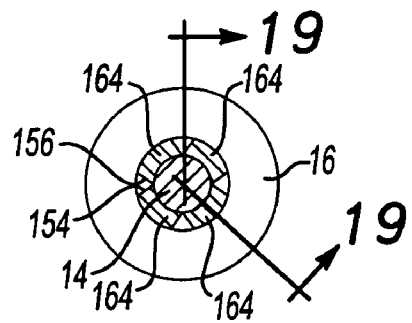
FIG. 18 is a cross-sectional view taken along line 18-18 as shown in FIG. 17.
Figure 19:
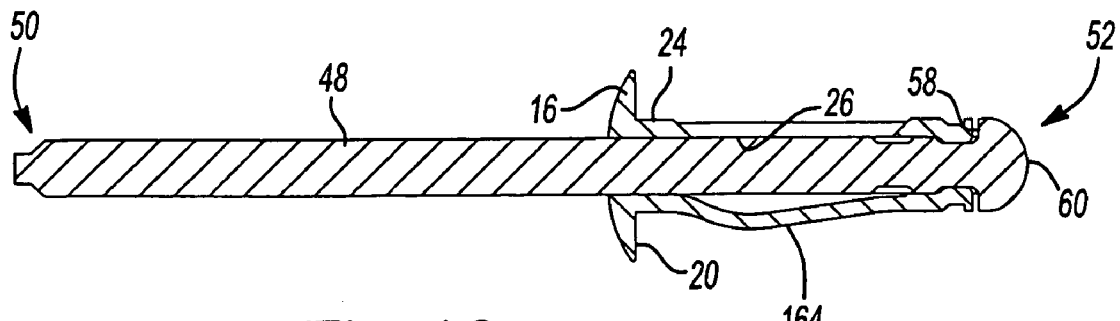
FIG. 19 is a cross-sectional view of the blind rivet taken along line 19-19 as shown in FIG. 18.

FIGS. 17-19 depict another alternate embodiment blind rivet 150. Blind rivet 150 is substantially similar to blind rivet 100 and blind rivet 10 except that the shape of the indentations having a slit have been modified. As such, like elements will retain their previously introduced reference numerals. Blind rivet 150 includes four circumferentially spaced apart indentations 152. Each indentation 152 has a substantially teardrop shape having a maximum width located at an axial position closer to flanged head 16 than mandrel head 56. The maximum width of the indentation is offset from the axial midpoint of a cut or slit 154 extending through rivet body 12. A first substantially planar surface 156 and a second substantially planar surface 158 are angled inwardly from outer cylindrical surface 24 of rivet body 12. Slit 154 terminates at end surfaces 160 and 162. In similar fashion to the end surfaces previously described, end surfaces 160 and 162 are substantially planar angled surfaces extending from outer cylindrical surface 24 to inner surface 26.

Four columns of material 164 are defined and positioned between each of indentations 152. The minimum cross section of each column 164 is axially positioned at the widest point of indentation 152. The columns 164 are outwardly bulged and define a maximum outer diameter at the axial position where each indentation 152 has its maximum width. Because the widest point of indentation 152 is positioned relatively closer to flanged head 16, the distance between surface 20 of flanged head 16 and surface 94 of secondary head 92 may be tailored to be a desired distance based on the location of the maximum width of indentation 152. Accordingly, a family of blind rivets may be designed where each member of the family defines a different distance between the secondary head and flanged head 16. Each member will be operable to clamp workpieces having different joint thicknesses.

Figure 20:
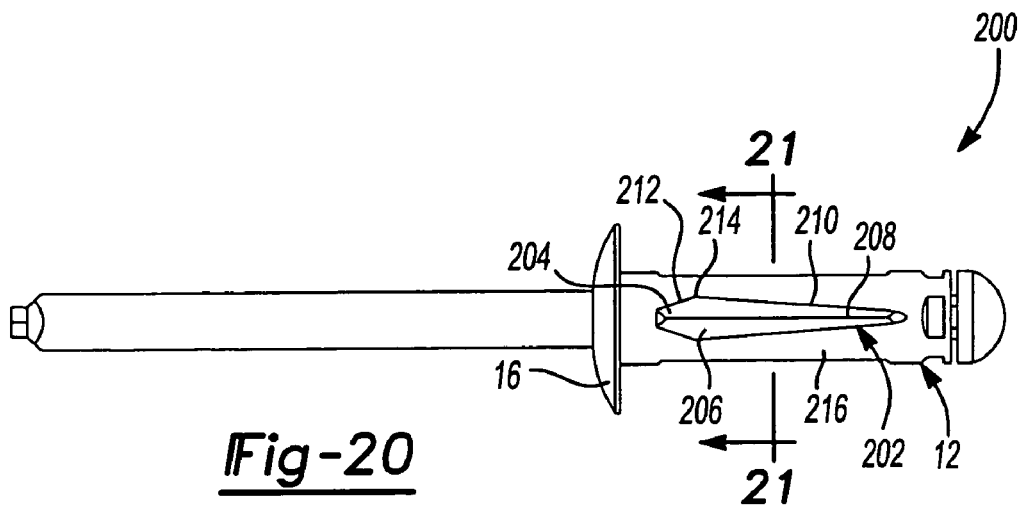
FIG. 20 is a side view of another alternate embodiment blind rivet.
Figure 21:
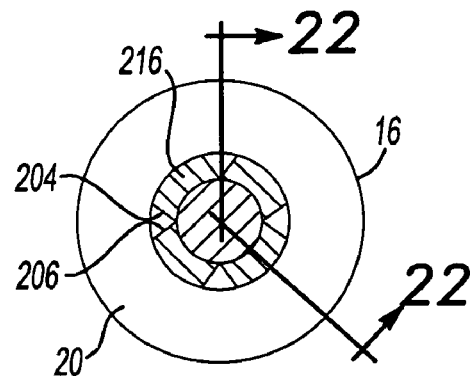
FIG. 21 is a cross-sectional view taken along line 21-21 as shown in FIG. 20.
Figure 22:
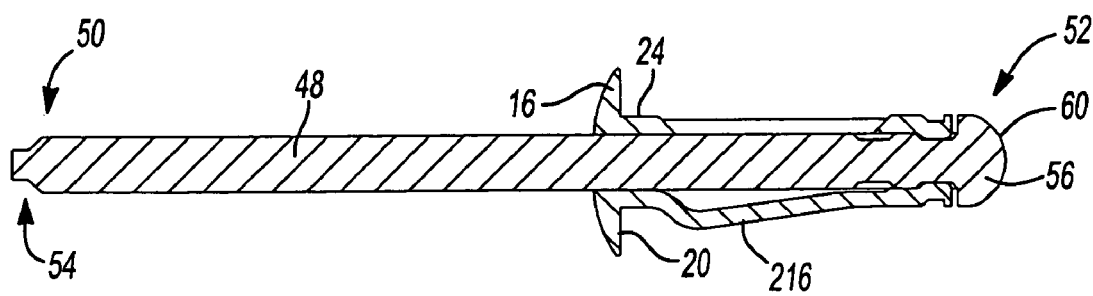
FIG. 22 is a cross-sectional view taken along line 22-22 as shown in FIG. 21.
Figure 23:
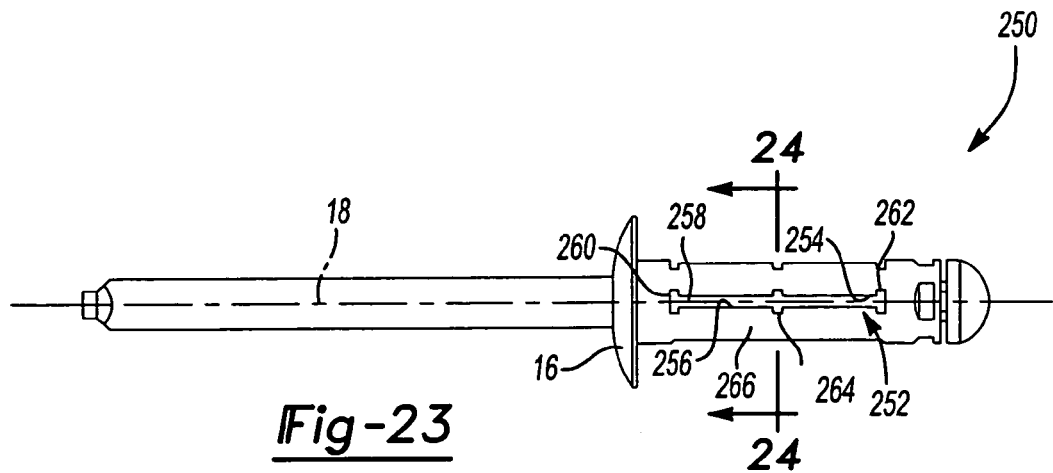
FIG. 23 is a side view of another alternate exemplary blind rivet.
Figure 24:
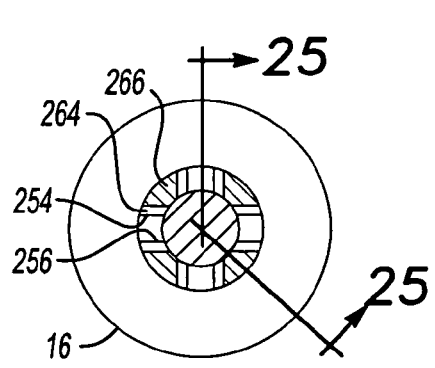
FIG. 24 is a cross-sectional view taken along line 24-24 as shown in FIG. 23.
Figure 26:
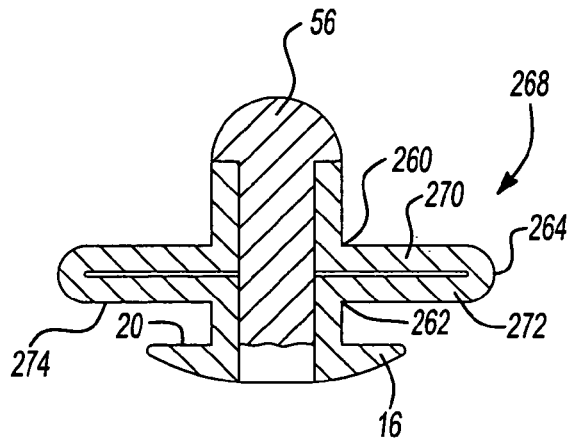
FIG. 26 is a cross-sectional view of the blind rivet shown in FIG. 23 after the rivet setting process has been completed.
Figure 25:
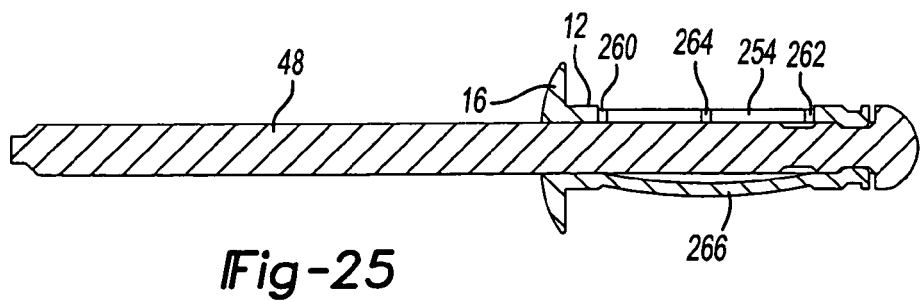
FIG. 25 is a cross-sectional view taken along line 25-25 as shown in FIG. 24.

FIGS. 20-22 depict another alternate embodiment blind rivet identified at reference numeral 200. Blind rivet 200 is substantially similar to the blind rivets previously described. For clarity, like elements will retain their previously introduced reference numerals.

Blind rivet 200 includes four indentations 202 circumferentially spaced apart from one another. Each indentation 202 includes a first substantially planar surface 204 and a second substantially planar surface 206 bounded by a common cut 208. First surface 204 includes a substantially linear first edge 210 and a substantially linear second edge 212. First edge 210 and second edge 212 meet at a relatively sharp inflection point 214. Second surface 206 is substantially similarly shaped as first surface 204. The width of indentation 202 is at its maximum at the axial location of inflection point 214. The cross-sectional width of column portions 216 positioned between indentations 202 are at their minimum at the longitudinal location of inflection point 214. Furthermore, column portions 216 are outwardly bulged and define a maximum outer diameter at the axial position of inflection point 214. Therefore, when a compressive load is applied to the walls of rivet body 12, buckling begins at the point of minimum wall section and a secondary flange (not shown) will be formed proximate flanged head 16.

FIGS. 23-26 depict another alternate embodiment blind rivet identified at reference numeral 250. Blind rivet 250 is substantially similar to the blind rivets previously described except that the indentations with longitudinally extending slits have been replaced with longitudinally extending slots 252. Like elements will retain their previously introduced reference numerals.

Each slot 252 extends longitudinally parallel to axis 18 and radially through rivet body 12. Each slot 252 is defined by a first side wall 254 and a second side wall 256. Side walls 254 and 256 are substantially planar surfaces spaced apart and parallel to one another. The spacing between side walls 254 and 256 define a gap 258. The ends of slot 252 include circumferentially extending slot portions 260 and 262. The circumferentially extending slot portions are symmetrically positioned in communication with the longitudinally extending slot 252 to form "T" shaped slot ends. Another circumferentially extending slot portion 264 is formed at the longitudinal mid-point of slot 252.

A column of rivet body material 266 longitudinally extends from flanged head 16 to the open end of rivet body 12 and is circumferentially positioned between two slots 252. Each column 266 buckles under compressive load during the rivet setting process to define legs 268 similar to legs 86 previously defined. The circumferentially extending slot portions 260, 262 and 264 form reduced cross-sectional areas in each column 266. The reduced cross-sectional areas plastically deform first. As such, the axial locations of the circumferentially extending slot portions define where the bend radii will be positioned. Specifically, column 266 forms legs 268 shown in FIG. 26 by bending at the axial location of slot portion 260 to form a first portion 270 of leg 268. Column 266 bends again at the axial location of slot portions 264 and 262 to define a portion 272 of leg 268. Accordingly, one skilled in the art should appreciate that the distance that leg 268 radially extends and that the axial spacing between surface 274 on leg portion 272 and surface 20 of flanged head 16 may be configured to a specific design application by defining the length of slot 252 and the axial position of circumferentially extending portions 260, 262 and 264.

Figure 27:
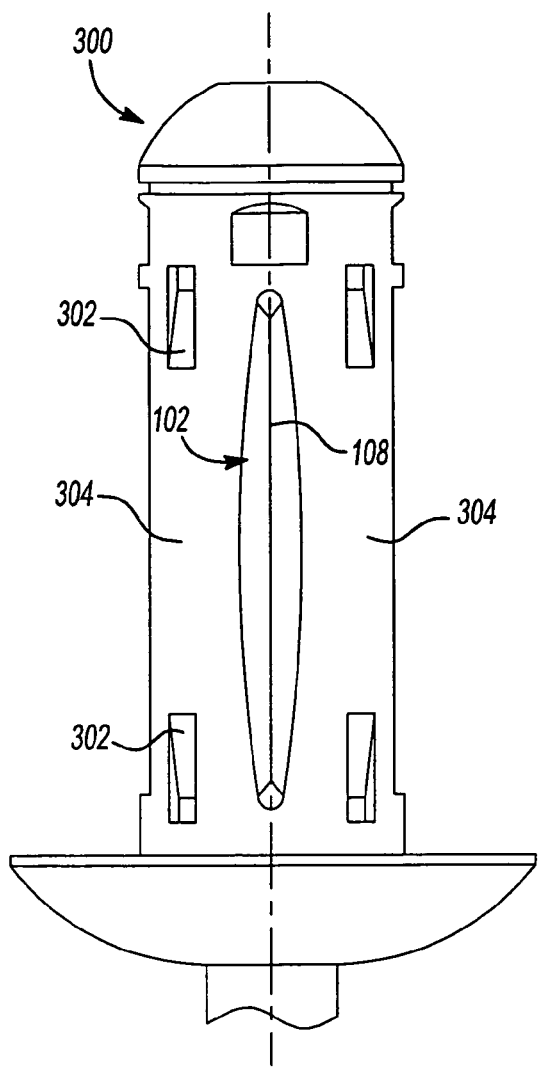
FIG. 27 is a side view of another alternate embodiment blind rivet.
Figure 28:
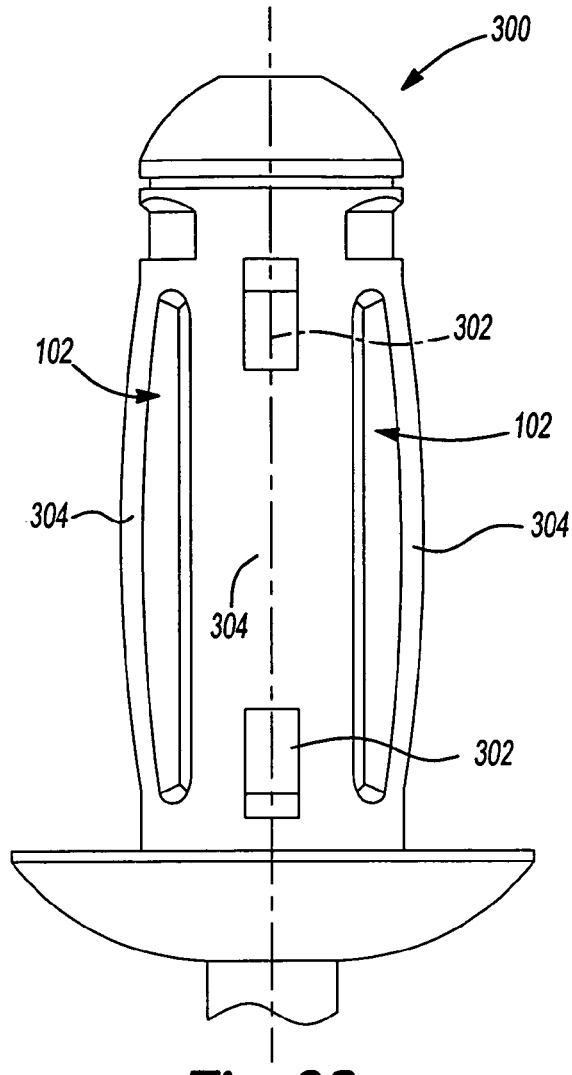
FIG. 28 is another side view of the alternate embodiment blind rivet shown in FIG. 27.

FIGS. 27 and 28 depict another alternate embodiment blind rivet at reference numeral 300. Blind rivet 300 is substantially similar to the rivet embodiment depicted in FIGS. 14-16 except that the rivet body includes an additional set of intermediate indentations 302. Intermediate indentations 302 assist in controlling the shape of the rivet body outer diameter. Specifically, intermediate indentations 302 define the barrel shape of a plurality of column portions 304. Column portions 304 are circumferentially spaced apart from one another and positioned between indentations 102. Intermediate indentations 302 function to encourage the column portions 304 to bend at their longitudinal mid-point.

Figure 29:
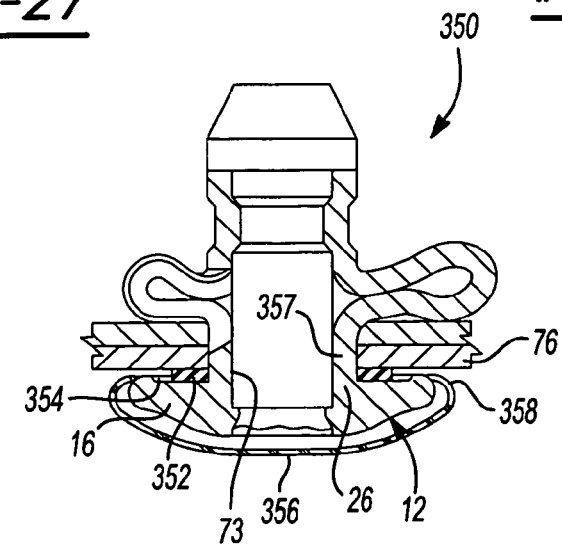
FIG. 29 is a cross-sectional side view depicting another alternate embodiment blind rivet embodiment shown after the completion of the rivet setting process and installation of a cap.

FIG. 29 shows another alternate embodiment blind rivet 350. Blind rivet 350 includes an elastomeric seal 352 positioned within a pocket 354 formed in flanged head 16. Elastomeric seal 352 sealingly engages workpiece 76 and rivet body 12 to resist ingress of contamination to the joint. An aesthetically-pleasing cap 356 is coupled to flanged head 16. Cap 356 engages flanged head 16 in a snap-fit arrangement where a lip 358 of cap 356 biasedly engages flanged head 16. It can be appreciated in FIG. 29 that the uniform diameter section 73 of mandrel 14 provides resistance to ingress of moisture when the rivet is set by having a tight or interference fit in the rivet body 26 at a location 357 adjacent to the flange 16. Cap 356 may be colored to match or complement the environment in which it is placed.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A blind rivet comprising a body including a longitudinally elongated and hollow main body segment, which is deformable in a laterally expanded direction, and a laterally enlarged head, the main segment further including an outer surface having at least one longitudinally elongated indentation having a longitudinally oriented slit extending therethrough, a majority of the indentation being defined by tapered surfaces that are substantially planar and extend between the outer surface and an inner surface of the main body segment, a mandrel including a longitudinally elongated shaft and a laterally enlarged segment, at least a portion of the shaft being located within the main body segment and having an indentation, the main body segment including an inwardly extending flange partially positioned within the indentation of the mandrel to couple the mandrel to the body, disposed adjacent to the longitudinally elongated indentation is a column, said column being outwardly bulged away from the mandrel when the rivet is in an unset configuration;

wherein the indentation at each longitudinal end of the slit is formed by a substantially planar inclined end surface, each of said planar end surfaces being bounded by three boundary edges, two of said edges terminating together at an intersection with the end of the slit.

2. The blind rivet of claim 1 wherein a portion of the mandrel engages the main body segment of the rivet body to resist ingress of contamination into the hollow main body segment.

3. The blind rivet of claim 1 wherein longitudinal edges of the indentation are curved away from each other with the greatest spacing between the longitudinal edges being at a longitudinal center of the indentation, and with smaller spacing being adjacent ends of the indentation.

4. The blind rivet of claim 3 wherein the spacing between the longitudinal edges at a longitudinal center of the indentation define a minimum wall thickness of the hollow main body segment.

5. The blind rivet of claim 1 wherein the tapered surfaces are curved in a laterally extending direction.

6. The blind rivet of claim 1 wherein the column is laterally displaced away from the mandrel near a longitudinal center of the indentation in a first position, and wherein ends of the indentation are in contact with the mandrel when the longitudinal center is in the first position.

7. The blind rivet of claim 1 wherein the main body segment deforms during rivet setting to create a secondary head having at least two secondary bearing surfaces substantially extending in the lateral direction, the secondary bearing surfaces having a lateral periphery further away from the remaining main body segment than a lateral periphery of the head.

8. The blind rivet of claim 1 wherein there are at least four of the indentations and slits, each being substantially identical to the others.

9. The blind rivet of claim 1 wherein the indentation includes four substantially planar surfaces, none of the planar surfaces being parallel or perpendicular to one another.

10. The blind rivet of claim 1 further including a seal positioned within a pocket formed in the laterally enlarged head, the seal being adapted to sealingly engage a surface of a workpiece.

11. The blind rivet of claim 1 wherein the main body segment has a stepped outer diameter.

12. The blind rivet of claim 1 wherein the majority of the indentations are defined by tapered surfaces that are substantially planar and define an included angle ranging between 20 and 90 degrees.

13. The blind rivet according to claim 1 wherein the column has an exterior convex surface and an interior concave surface.

14. The blind rivet according to claim 1 wherein a minimum wall thickness portion of the column is located at an axial midpoint of the slit.

15. The blind rivet according to claim 1, wherein there is a non-smooth transition between the end surfaces and adjacent portions of the indentation.

16. A blind rivet as claimed in claim 1 wherein the third side of said surface extends in a direction generally transverse to the orientation of said slit.

17. A blind rivet comprising a rivet body including a longitudinally elongated tubular segment and a laterally flanged head, at least one longitudinally elongated indentation having a cut extending through the indentation, a majority of the indentation being defined by tapered surfaces, the indentation and the cut being located on the tubular segment between and being internally spaced away from the head and an opposite end of the tubular segment, the indentation at each longitudinal end of the cut being formed by a substantially planar inclined end surface, each of said planar end surfaces being bounded by three boundary edges, two of said edges terminating together at an intersection with the end of the cut, surfaces defining longitudinal ends of the indentation being outwardly angled and opening away from each other, wherein longitudinal edges of the indentation are curved away from each other with a greatest spacing between the longitudinal edges being at a longitudinal center of the indentation, and with a smaller spacing being adjacent ends of the indentation, adjacent the longitudinally elongated indentation is a column having a convex outer surface and a concave inner surface when the rivet is in an unset configuration.

18. The blind rivet of claim 17 wherein a spacing between longitudinal edges of the indentation is greatest closer to one end of the indentation.

19. The blind rivet of claim 17 further including a mandrel including a longitudinally elongated shaft and a laterally enlarged segment, at least a portion of the shaft being located within the main body segment and having an indentation, the main body segment including an inwardly extending flange partially positioned within the indentation of the mandrel.

20. The blind rivet of claim 19 wherein the main body segment is laterally displaced away from the mandrel near a longitudinal center of the indentation in a first position, and wherein the ends of the indentation are in contact with the mandrel when the longitudinal center is in the first position.

21. The blind rivet of claim 17 wherein the tapered surfaces are substantially planar and extend between an outer surface and an inner surface of the main body segment.

22. The blind rivet of claim 17 wherein the tapered surfaces are curved in a laterally extending direction.

23. The blind rivet of claim 17 wherein the main body segment deforms during rivet setting to create a secondary head having at least two secondary bearing surfaces substantially extending in the lateral direction, the secondary bearing surfaces having a lateral periphery further away from the remaining main body segment than a lateral periphery of the head.

24. The blind rivet of claim 17 wherein the elongated tubular segment includes an enlarged diameter portion adjacent the laterally flanged head.

25. A blind rivet of claim 17 wherein the tapered surfaces define an included angle ranging between 20 and 90 degrees.

26. The bind rivet according to claim 17, wherein there is a non-smooth transition between the surfaces defining the longitudinal ends and adjacent portions of the indentation.

27. A blind rivet comprising a tubular segment including at least one longitudinally elongated slot extending substantially parallel to a longitudinal centerline of the tubular segment, the slot being defined in part by longitudinal column portions that are laterally displaced away from the longitudinal centerline of the tubular segment, said column portion being bulged away from a mandrel, said column having a convex exterior surface and a concave inner surface when the rivet is in an unset configuration; and
    wherein each of the longitudinal ends of the slot is formed by a substantially planar inclined end surface, each of said planar end surfaces being bounded by three boundary edges, two of said edges terminating together at an intersection with the end of the slot.

28. The blind rivet of claim 27 wherein at least one longitudinal side of the slot has a longitudinal straight section between at least two laterally extending sections.

29. The blind rivet of claim 27 wherein there are at least four of the slots equidistantly spaced on the cylindrical segment of the body.

30. The blind rivet of claim 27 wherein the tubular segment deforms during installation to create a secondary head having at least two secondary bearing surfaces substantially extending in the lateral direction, the secondary bearing surfaces having a lateral periphery further away from the remaining tubular segment than a lateral periphery of the head.

31. The blind rivet of claim 27 wherein the column portions have a minimum wall thickness at a midpoint of the elongated slots that defines an axial position where each of the column portions will buckle.

32. The blind rivet of claim 27 wherein the longitudinally elongated slot is defined by tapered surfaces that are substantially planar and define an included angle ranging between 20 and 90 degrees.

33. The blind rivet according to claim 27, wherein there is a non-smooth transition between the end surfaces and adjacent portions of the indentation.

34. A method of joining workpieces with a blind rivet,
    the blind rivet including a hollow body segment and a laterally enlarged head, a plurality of longitudinally elongated indentations being formed on the body segment to provide a plurality of circumferentially spaced apart column portions, each column portion including substantially half of one indentation along a first edge, substantially half of another indentation along a second edge, and having a slit extending through each indentation, the column portions being laterally displaced near the longitudinal center of the indentations to provide the body segment with an exterior convex surface and an interior concave surface when the rivet is in its unset configuration, and wherein the indentation at each longitudinal end of the slit is formed by a planar inclined end surface, each of said end surfaces being bounded by three boundary edges, two of said edges terminating together at an intersection with the end of the slit, the method including:

inserting the blind rivet through apertures formed in the workpieces;

applying a compressive load to the blind rivet body segment;

forming a secondary head by folding the column portions; and engaging the secondary head with another one of the workpieces to clamp the workpieces between the laterally enlarged head and the secondary head.

35. The method of claim 34 wherein longitudinal edges of the indentation are curved away from each other with the greatest spacing between the longitudinal edges being at a longitudinal center of the indentation, and with smaller spacing being adjacent ends of the indentation, the method further including buckling the column portions at a longitudinal position substantially coplanar with the location of the greatest spacing between the longitudinal edges.

36. The method of claim 34 further including forming four substantially similar laterally extending legs during the buckling and folding steps to define the secondary head.

37. The method of claim 34 further including retaining a portion of the mandrel with the body segment before and after the buckling step.

38. The method of claim 34 further including sealing the interface between the rivet body segment and one of the workpieces.

39. The method of claim 34 further including covering a portion of the blind rivet with a cap to conceal the blind rivet from view after the workpieces are clamped together by the blind rivet.

40. The method of claim 34 wherein the compressive load is applied to the rivet body segment using a pullable mandrel.

41. A method of joining workpieces with a blind rivet, the blind rivet including a hollow body segment and a laterally enlarged head, a plurality of longitudinally elongated indentations being formed on the body segment to provide a plurality of circumferentially spaced apart column portions, each column portion including substantially half of one indentation along a first edge, substantially half of another indentation along a second edge, and having a slit extending through each indentation, and wherein the indentation at each longitudinal end of the slit is formed by a substantially planar inclined end surface, each of said planar end surfaces being bounded by three boundary edges, two of said edges terminating together at an intersection with the end of the slit, the method including the steps of:

inserting the blind rivet through apertures formed in the workpieces;

applying a compressive load to the blind rivet body segment;

forming a secondary head by folding the column portions; and engaging the secondary head with another one of the workpieces to clamp the workpieces between the laterally enlarged head and the secondary head.

* * * * *